(12) United States Patent
Sitaram et al.

(10) Patent No.: US 9,762,304 B1
(45) Date of Patent: Sep. 12, 2017

(54) SYSTEMS AND METHODS FOR PROTECTING CARRIER AGGREGATION

(71) Applicant: Sprint Spectrum LP, Overland Park, KS (US)

(72) Inventors: Krishna Sitaram, Chantilly, VA (US); Chunmei Liu, Great Falls, VA (US); Hemanth Pawar, Brambleton, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 57 days.

(21) Appl. No.: 14/792,880

(22) Filed: Jul. 7, 2015

(51) Int. Cl.
*H04W 8/22* (2009.01)
*H04B 7/06* (2006.01)
*H04W 24/02* (2009.01)
*H04W 72/04* (2009.01)

(52) U.S. Cl.
CPC .......... *H04B 7/0617* (2013.01); *H04W 24/02* (2013.01)

(58) Field of Classification Search
CPC . H04W 28/06; H04W 72/046; H04W 76/025; H04L 5/001; H04L 5/0053
USPC .................................................. 370/329, 252
See application file for complete search history.

(56) References Cited

U.S. PATENT DOCUMENTS

| 2011/0028148 | A1 | 2/2011 | Lee et al. | |
| 2013/0157660 | A1* | 6/2013 | Awad | H04W 72/046 455/435.1 |
| 2013/0237208 | A1* | 9/2013 | Vujcic | H04B 7/15507 455/418 |
| 2014/0321346 | A1 | 10/2014 | Chung et al. | |

* cited by examiner

*Primary Examiner* — Charles C Jiang
*Assistant Examiner* — Will Lin
(74) *Attorney, Agent, or Firm* — Jones Robb, PLLC

(57) ABSTRACT

Systems and methods are described for protecting carrier aggregation. Data may be communicated between an access node and a wireless device using carrier aggregation such that communications is performed over a primary carrier and a secondary carrier. It may be determined that conditions for one or more of the access node and the wireless device meet a beamforming criteria. It may then be determined whether an adjustment to a configuration for the carrier aggregation is available for the wireless device. The configuration to the carrier aggregation may be adjusted when the adjustment is determined to be available.

18 Claims, 8 Drawing Sheets

SYSTEMS AND METHODS FOR PROTECTING CARRIER AGGREGATION

TECHNICAL BACKGROUND

Telecommunication systems, such as cellular networks or other wireless networks, use various network links throughout the network to communicate. In certain circumstances, a portion of the network may experience high load (e.g., load above a threshold) or poor channel conditions. For example, a communication link may experience large amount of data traffic or poor channel conditions may render a communication link less effective, and the efficiency of the system may suffer.

A wireless communication network may leverage one or more network features in order to mitigate against these negative conditions that certain network links may face. For instance, carrier aggregation may increase the potential data rate that a wireless device may receive from an access node. Beamforming may similarly increase the channel quality for a communication link between a wireless device and an access node. Accordingly, a system that effectively leverages network features to mitigate against negative channel conditions may be able to provide a high quality service to users of the system.

OVERVIEW

Systems and methods are described for protecting carrier aggregation. Data may be communicated between an access node and a wireless device using carrier aggregation such that communications is performed over a primary carrier and a secondary carrier. It may be determined that conditions for one or more of the access node and the wireless device meet a beamforming criteria. It may then be determined whether an adjustment to a configuration for the carrier aggregation is available for the wireless device. The configuration to the carrier aggregation may be adjusted when the adjustment is determined to be available.

DETAILED DESCRIPTION

Systems and methods are described for protecting carrier aggregation. In an embodiment, an access node may be using carrier aggregation to communicate with a wireless device. For example, an access node may use a primary carrier and a secondary carrier for communication with a wireless device. In some examples, conditions for beamforming may be met for the access node and/or wireless device. For example, the wireless device may move to an edge of the coverage area (i.e., signal area) for the access node.

However, in an embodiment, steps may be performed to protect the carrier aggregation communication between the wireless device and the access node. For example, a configuration may be adjusted for the carrier aggregation such that the conditions for beamforming are no longer met by the access node and/or wireless device. One or more of the primary carrier or secondary carrier(s) for the carrier aggregation may be adjusted. In such an embodiment, the carrier aggregation communication between the access node and wireless device may be protected.

Figure 1:
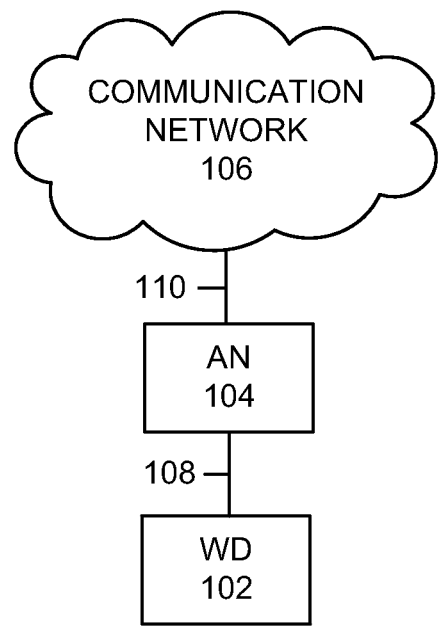
FIG. 1 illustrates an exemplary communication system to protect carrier aggregation.
Figure 1:

FIG. 1 illustrates an exemplary communication system 100 to protect carrier aggregation comprising wireless devices 102, access node 104, communication network 106, and communication links 108, and 110. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented.

Access node 104 is a network node capable of providing wireless communications to wireless device 102, and can be, for example, a base transceiver station, a radio base station, and an eNodeB device. Access node 104 may communicate with communication network 106 over communication link 110 respectively.

Although only access node 104 is illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108 and 110 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2A:
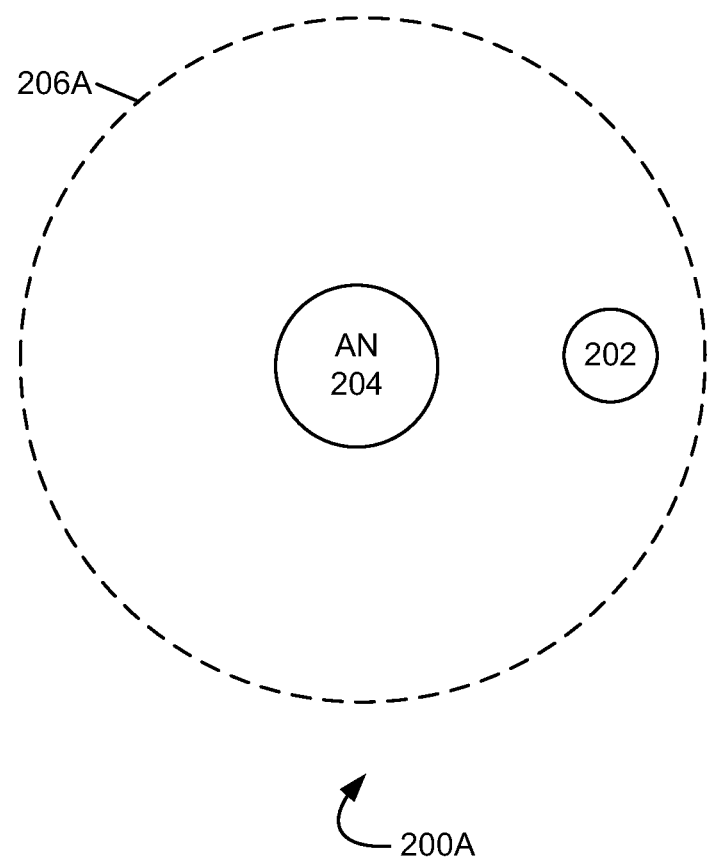
FIGS. 2A-2B illustrate exemplary systems to protect carrier aggregation.
Figure 2B:
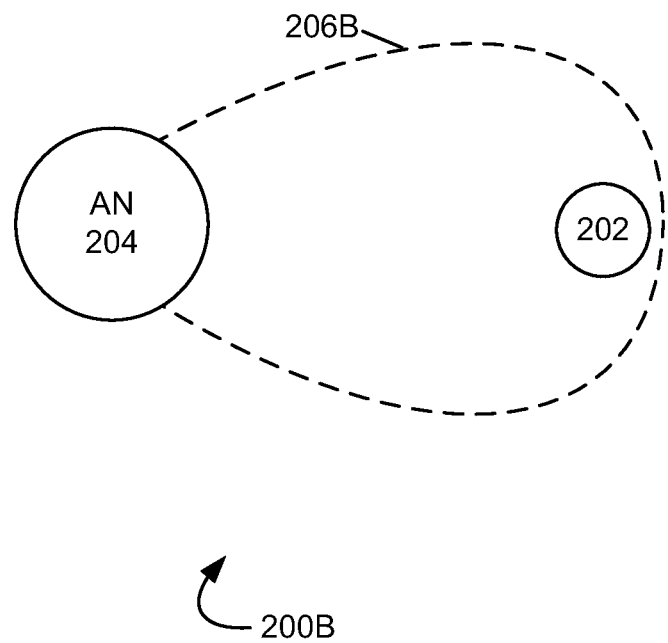

FIGS. 2A and 2B illustrate exemplary communication systems 200A and 200B for protecting carrier aggregation. Systems 200A and 200B comprise wireless device 202, access node 204, signal area 206A, and adjusted signal beam 206B. Wireless device 202 may comprise a device similar to wireless device 102. Access node 204 may comprise an access node similar to access node 104.

In operation, access node 204 may establish communication with wireless device 202 such that access node 204 provides the wireless device access to a communication network (e.g., communication network 106). Signal area 206A may comprise an area around access node 204 where a wireless device may detect wireless signals transmitted from the access node at a signal level above a threshold. For example, signal area 206A may comprise coverage areas for access node 204, such that wireless devices that fall within the signal area may be provided wireless services by the access node.

In an embodiment, systems 200A and 200B may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, systems 200A and 200B may leverage beamforming to enhance the wireless services provided to wireless device 202. For example, wireless device 202 may be located at the edge of signal area 206A. Accordingly, the wireless device may comprise a low channel quality (e.g., a channel quality indicator (CQI) below a threshold). The low channel quality may be based on a high interference level for the signals received by wireless device 202, or other suitable factors. In an embodiment, access node 204 may perform beamforming such that a signal transmitted to wireless device 202 is adjusted based on the location of the wireless device. For example, an adjusted beam 206B may be transmitted from access node 204 such that wireless device 202 may experience greater channel quality when communicating with access node 204. In an embodiment, the adjusted beam 206B may comprise of signals transmitted over a frequency band assigned to wireless device 202 (e.g., assigned as the frequency band that access node 204 uses to communicate with wireless device 202).

In an embodiment, beamforming may be accomplished using a plurality of antennas at access node 204 that implement, for example, a multiple input multiple output (MIMO) protocol. The signals from each of the plurality of antennas may be controlled such that the net signal from the access node may be transmitted towards wireless device 202 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 202 and destructive interference in other directions (e.g., away from wireless device 202). System 200B shows access node 204 adjusting a beam emitted by the access node towards wireless device 202. For example, adjusted signal beam 206B may be narrowed towards the location of wireless device 202.

In an embodiment, carrier aggregation may also be implemented by the systems 200A and 200B. For example, access node 204 may communicate with wireless device 202 using carrier aggregation such that the data rate (or throughput) for the communication is greater than the data rate for single carrier communication. In an embodiment, access node 204 may communicate with wireless device 202 using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 204 and wireless device 202, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In an embodiment, access node 204 may communicate with wireless device 202 using carrier aggregation. In some examples, conditions for beamforming may be met for access node 204 and/or wireless device 202. For example, wireless device 202 may move to an edge of signal area 206A. However, in an embodiment, steps may be performed to protect the carrier aggregation. For example, a configuration may be adjusted for the carrier aggregation such that the conditions for beamforming are no longer met by the access node and/or wireless device. One or more of the primary carrier or secondary carrier(s) for the carrier aggregation may be adjusted. In such an embodiment, the carrier aggregation communication between access node 204 and wireless device 202 may be protected.

Figure 3:
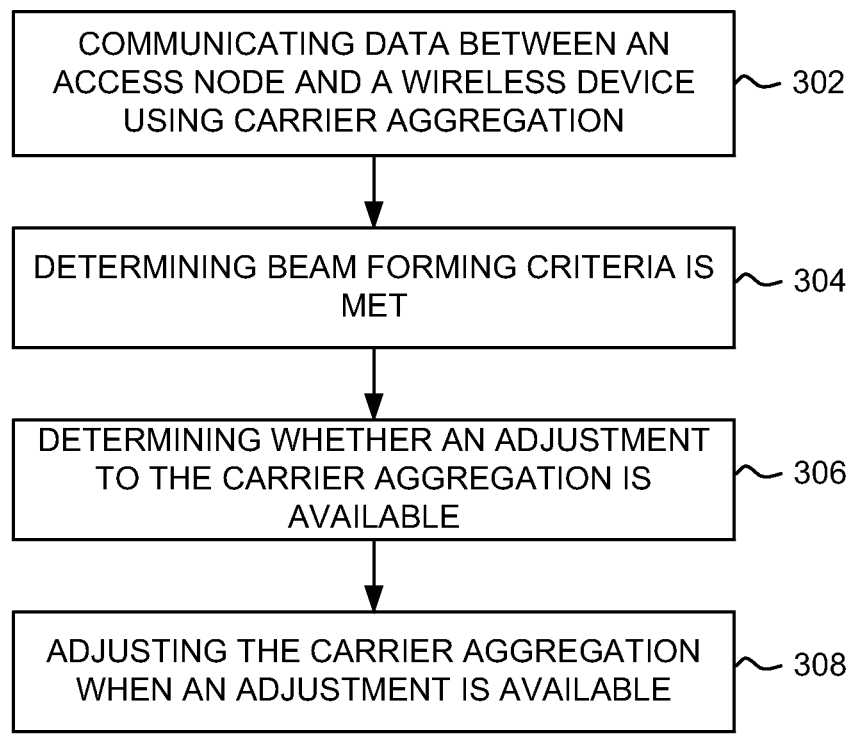
FIG. 3 illustrates an exemplary method of for protecting carrier aggregation.

FIG. 3 illustrates an exemplary method protecting carrier aggregation. The method will be discussed with reference to the exemplary communication systems 200A and 200B illustrated in FIGS. 2A and 2B, however, the method can be implemented with any suitable communication system.

Referring to FIG. 3, at step 302, data may be communicated between an access node and a wireless device using carrier aggregation such that communications is performed over a primary carrier and a secondary carrier. For example, access node 204 and wireless device 202 may communicate using carrier aggregation, wherein data is communicated over a primary carrier and one or more secondary carriers.

At step 304, it may be determined that conditions for one or more of the access node and the wireless device meet a beamforming criteria. For example, it may be determined that conditions for access node 204 and/or wireless device 202 meet a beamforming criteria. The conditions may comprise one or more of a load on access node 204 (e.g., number of RRC connections, processing load, or any other suitable load), a received signal level at wireless device 202 (e.g., RSRP), a channel quality indicator (CQI) for wireless device 202, application requirements for wireless device 202, a location for wireless device 202, and any other suitable conditions. The beamforming criteria may comprise criteria for one or more of the conditions for access node 204 and/or wireless device 202 (e.g., load criteria, signal level criteria, application requirements criteria, and the like). In an embodiment, any suitable conditions and/or beamforming criteria may be implemented.

At step 306, it may then be determined whether an adjustment to a configuration for the carrier aggregation is available for the wireless device. For example, it may be determined whether an adjustment to one or more of the primary carrier or secondary carrier(s) is available for the wireless device. In an embodiment, the adjustment may comprise a change in the primary carrier (e.g., frequency band change), a change in the secondary carrier (e.g., frequency band change), a change in the number of secondary carriers, or any other suitable adjustment.

In some embodiments, an overhead may be determined for a plurality of carriers available to be used for communication at access node 204. For example, a plurality of carriers (e.g., frequency bands) may be available for communication at access node 204, and an overhead for each of the carriers may be calculated. An adjustment to the carrier aggregation may be determined based on the overhead for each carrier available for communication. In an embodiment, the calculated overhead may comprise a number of wireless devices that receive a beam formed signal over each carrier.

At step 308, the configuration to the carrier aggregation may be adjusted when the adjustment is determined to be available. For example, a configuration for the carrier aggregation used for communicate between access node 204 and wireless device 202 may be adjusted when the adjustment is determined to be available.

Figure 4:
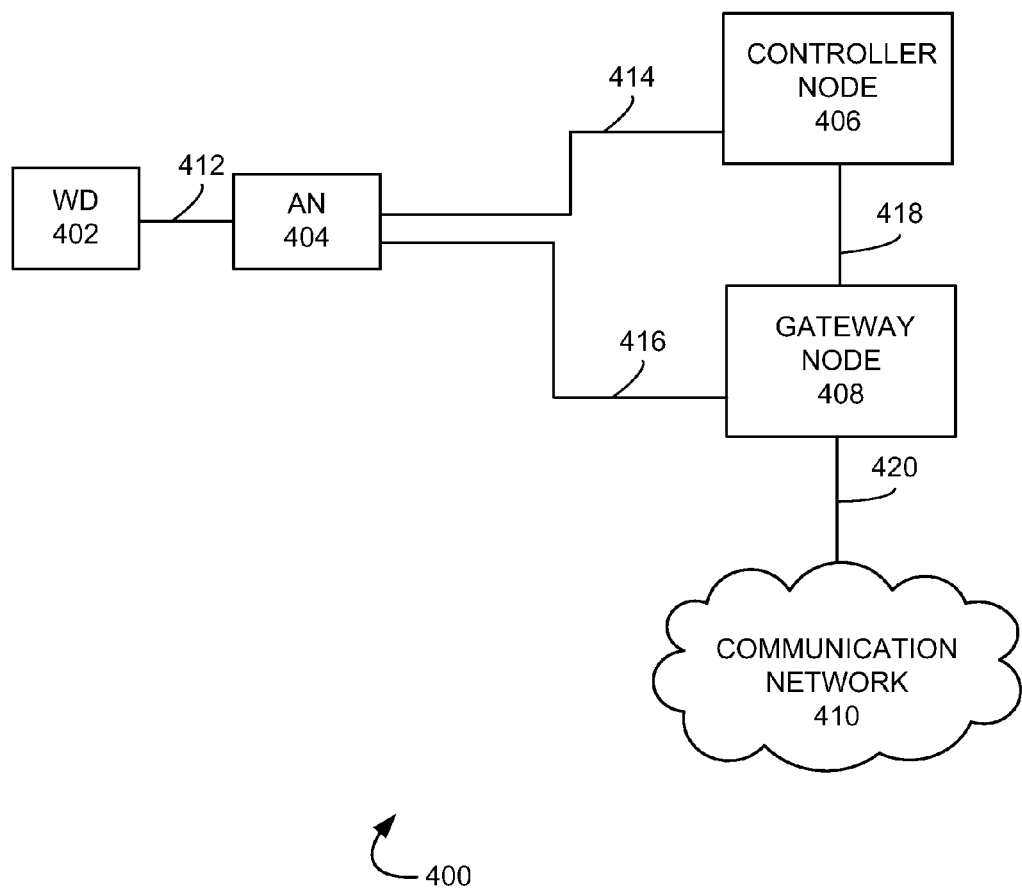
FIG. 4 illustrates another exemplary system to protect carrier aggregation.

FIG. 4 illustrates another exemplary communication system 400 to protect carrier aggregation. Communication system 400 may comprise wireless device 402, access node 404, controller node 406, gateway node 408, communication network 410, and communication links 412, 414, 416, 418, and 420. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access node 404 is a network node capable of providing wireless communications to wireless device 402, and can be, for example, a base transceiver station, a radio base station, or an eNodeB device. In an embodiment, access node 404 can comprise a serving access node for wireless device 402.

Access node 404 may communicate with controller node 406 over communication link 414 and with gateway node 408 over communication link 416.

Controller node 406 can be any network node configured to manage services within system 400. Controller node 406 may provide other control and management functions for system 400. The controller node 406 can be a single device having various functions or a plurality of devices having differing functions. For example, controller node 406 can include at least one of a multi-cell/multicast coordination entity (MCE), a mobility management entity (MME), a radio network controller (RNC), a mobile switching center (MSC), and a combination thereof.

Controller node 406 can comprise a processor and associated circuitry to execute or direct the execution of computer-readable instructions to obtain information. Controller node 406 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 406 can receive instructions and other input at a user interface. Controller node 406 can comprise a processor and associated circuitry to execute or direct the execution of computer-readable instructions to obtain information.

Gateway node 408 is a network element which can comprise a processor and associated circuitry to execute or direct the execution of computer-readable instructions. Gateway node 408 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 408 can provide instructions to access node 404 related to channel selection in communications with wireless device 402. For example, gateway node 408 can comprise at least one of a serving gateway (SGW), a packet data network gateway (PDNGW), a cellular gateway (CGW), and a combination thereof.

Communication network 410 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 410 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 410 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 412, 414, 416, 418, and 420 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 404, controller node 406, gateway node 408, and communication network 410 which are omitted for clarity, including additional processing nodes, routers, gateways, and physical and/or wireless data links for carrying data among the various network elements. In an embodiment, any of controller node 406, gateway node 408, and one or more modules of access node 404 may perform all or parts of the methods of FIGS. 3 and 6.

Figure 5:
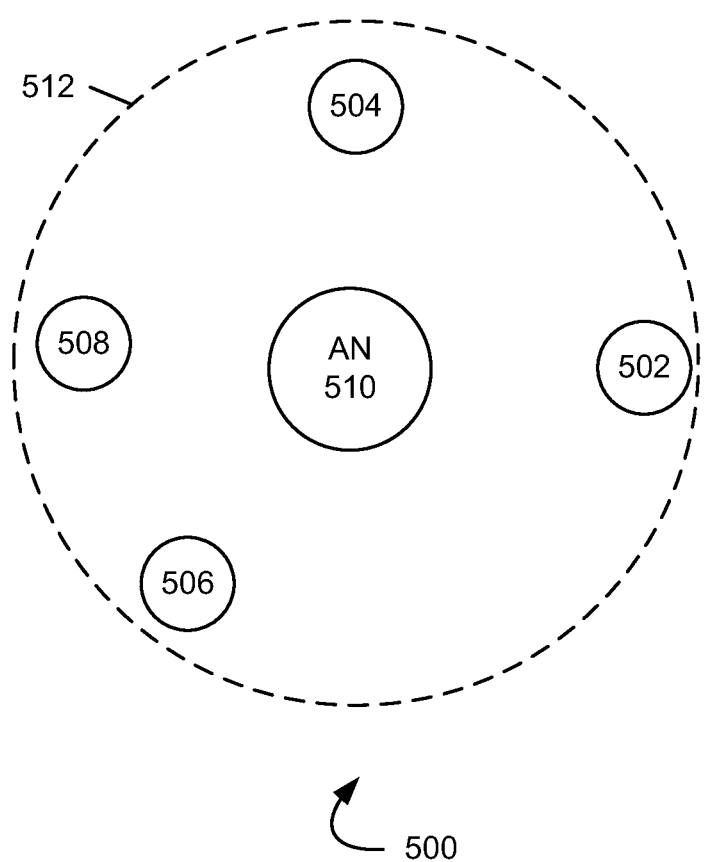
FIG. 5 illustrates another exemplary system to protect carrier aggregation.

FIG. 5 illustrates exemplary communication system 500 for protecting carrier aggregation. System 500 comprises wireless device 502, 504, 506 and 508, access node 510, and signal area 512. Wireless devices 502, 504, 506 and 508 may comprise devices similar to wireless device 402. Access node 510 may comprise an access node similar to access node 404.

In operation, access node 510 may establish communication with wireless device 502 such that access node 510 provides the wireless device access to a communication network (e.g., communication network 410). Signal area 512 may comprise an area around access node 510 where a wireless device may detect wireless signals transmitted from the access node at a signal level above a threshold. For example, signal area 512 may comprise coverage areas for access node 510, such that wireless devices that fall within the signal area may be provided wireless services by the access node.

In an embodiment, system 500 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 500 may leverage beamforming to enhance the wireless services provided to wireless device 502. For example, wireless device 502 may be located at the edge of signal area 512. Accordingly, the wireless device may comprise a low channel quality (e.g., a channel quality indicator (CQI) below a threshold). The low channel quality may be based on a high interference level for the signals received by wireless device 502, or other suitable factors. In an embodiment, access node 510 may perform beamforming such that a signal transmitted to wireless device 502 is adjusted based on the location of the wireless device. For example, an adjusted beam may be transmitted from access node 510 such that wireless device 502 may experience greater channel quality when communicating with access node 510. In an embodiment, the adjusted beam may comprise of signals transmitted over a frequency band assigned to wireless device 502 (e.g., assigned as the frequency band that access node 510 uses to communicate with wireless device 502). The adjusted beam transmitted from access node 510 may be similar to adjusted beam 206B of FIG. 2B In an embodiment, beamforming may be accomplished using a plurality of antennas at access node 510 that implement, for example, a multiple input multiple output (MIMO) protocol. The signals from each of the plurality of antennas may be controlled such that the net signal from the access node may be transmitted towards wireless device 502 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 502 and destructive interference in other directions (e.g., away from wireless device 502).

In an embodiment, carrier aggregation may also be implemented by the system 500. For example, access node 510 may communicate with wireless device 502 using carrier aggregation such that the data rate (or throughput) for the communication is greater than the data rate for single carrier communication. In an embodiment, access node 510 may communicate with wireless device 502 using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 510 and wireless device 502, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In an embodiment, access node 510 may communicate with wireless device 502 using carrier aggregation. In some examples, conditions for beamforming may be met for access node 510 and/or wireless device 502 while carrier aggregation is used for communication. For example, wireless device 502 may move to an edge of signal area 512. However, in an embodiment, steps may be performed to protect the carrier aggregation. For example, a configuration may be adjusted for the carrier aggregation such that the conditions for beamforming are no longer met by the access node and/or wireless device. One or more of the primary carrier or secondary carrier(s) for the carrier aggregation may be adjusted. In such an embodiment, the carrier aggregation communication between access node 510 and wireless device 502 may be protected.

Figure 6:
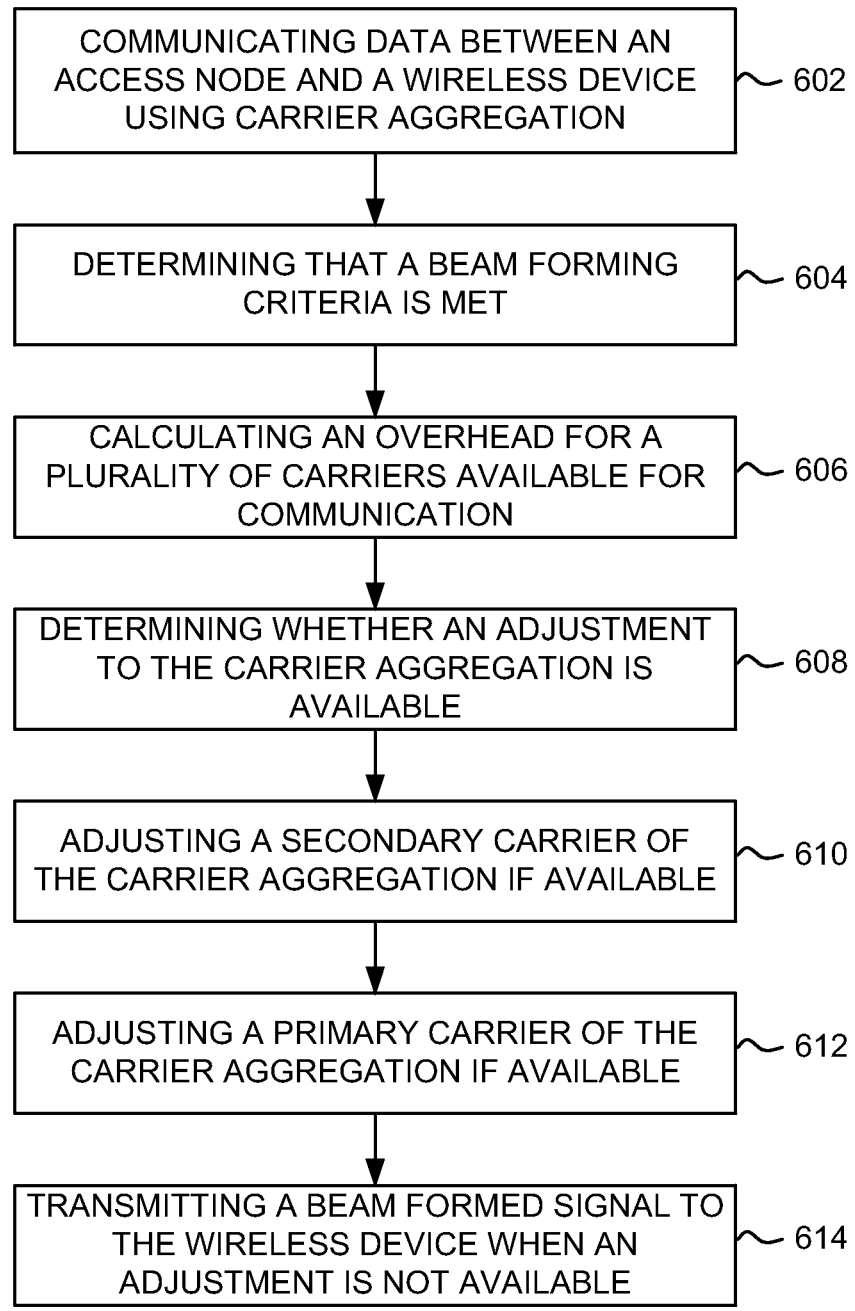
FIG. 6 illustrates another exemplary method of protecting carrier aggregation.

FIG. 6 illustrates an exemplary method for protecting carrier aggregation. The method will be discussed with reference to the exemplary communication system 500 illustrated in FIG. 5, however, the method can be implemented with any suitable communication system.

Referring to FIG. 6, at step 602, data may be communicated between an access node and a wireless device using carrier aggregation such that communications is performed over a primary carrier and a secondary carrier. For example, access node 510 and wireless device 502 may communicate using carrier aggregation, wherein data is communicated over a primary carrier and one or more secondary carriers. The carrier aggregation may leverage one or more of intra-band carrier aggregation with contiguous component carriers, intra-band carrier aggregation with non-contiguous component carriers, or inter-band carrier aggregation.

At step 604, it may be determined that conditions for one or more of the access node and the wireless device meet a beamforming criteria. For example, it may be determined that conditions for access node 510 and/or wireless device 502 meet a beamforming criteria. The conditions may comprise one or more of a load on access node 510 (e.g., number of RRC connections, processing load, or any other suitable load), a received signal level at wireless device 202 (e.g., RSRP), a channel quality indicator (CQI) for wireless device 502, application requirements for wireless device 502, a location for wireless device 502, and any other suitable conditions. The beamforming criteria may comprise criteria for one or more of the conditions for access node 510 and/or wireless device 502 (e.g., load criteria, signal level criteria, application requirements criteria, and the like). In an embodiment, any suitable conditions and/or beamforming criteria may be implemented.

At step 606, an overhead for a plurality of carriers available for communication at the access node may be calculated. For example, a plurality of carriers (e.g., frequency bands) may be available for communication at access node 510, and an overhead for each of the carriers may be calculated. In an embodiment, the available carriers may comprise band classes, channels (e.g., 5 Mhz, 10 Mhz, or the like), or any other suitable frequency band.

In an embodiment, the overhead for a carrier may comprise one or more of a number of wireless devices communicating over the carrier (e.g., number of RRC connections), a data rate (or throughput) over the carrier, a number of wireless devices communicating over the carrier using a beam formed transmission, a number of wireless devices communicating over the carrier using carrier aggregation, and any other suitable utilization over the carrier. For example, the calculated overhead may comprise a combination of one or more of the values described herein for carrier overhead.

In an embodiment, the calculated overhead for a carrier may comprise a ratio of a utilization of the carrier to a data rate (or throughput) for data communicated over the carrier. For example, a carrier may comprise a plurality of channels that include synchronization channels, control channels, data channels, and any other suitable channel. Synchronization data may be communicated over the synchronization channels, control data may be communicated over the control channels, and user data (e.g., data for an application running on a wireless device) may be communicated over the data channels. In an embodiment, the calculated overhead may comprise a ratio of the overall data communicated over the carrier (e.g., over all channels) to the data communicated over the data channels (e.g., throughput or data rate). Such a ratio may indicate the data rate (or throughput) for a carrier to the signaling overhead for the carrier.

In an embodiment, a utilization for the carrier may comprise the number of wireless devices assigned to communicate over the carrier and a data rate (or throughput) for the carrier may comprise the aggregation of the data rates for the wireless devices communicating over the carrier (e.g., summation, average, and the like). For example, the calculated overhead may comprise the ratio of the utilization (e.g., number of wireless devices) to the data rate (or throughput). Such a ratio may indicate the data rate (or throughput) for a carrier per the number of wireless devices served by the carrier.

In an embodiment, the calculated overhead may comprise a number of wireless devices that receive a beam formed transmission over the carrier. For example, a plurality wireless devices may be assigned to a carrier for communication with access node 510, and one or more of the wireless devices may receive a beam formed transmission from access node 510 over the carrier. These one or more wireless devices may experience wireless conditions (e.g., interference conditions) such that a beamforming criteria has been triggered for these devices at the access node. Thus, a calculated overhead for each carrier may comprise the number of wireless devices that receive a beam formed transmission over the carrier.

At step 608, it may be determined whether an adjustment to a configuration for the carrier aggregation is available for the wireless device. For example, it may be determined whether an adjustment to one or more of the primary carrier or secondary carrier(s) is available for wireless device 502. In an embodiment, the adjustment may comprise a change in the primary carrier (e.g., frequency band change), a change in the secondary carrier (e.g., frequency band change), a change in the number of secondary carriers, or any other suitable adjustment.

In an embodiment, the determined adjustment may be based on the calculated overhead for each carrier available for communication at access node 510. For example, the calculated overhead for each carrier available for communication may be compared to a first overhead criteria, and the carriers that comprise an overhead that meet the first criteria may be available to serve as a secondary component carrier for the carrier aggregation. The calculated overhead for each carrier available for communication may also be compared to a second overhead criteria, and the carriers that comprise an overhead that meet the second criteria may be available to serve as the primary component carrier for the carrier aggregation. In an embodiment, the first criteria and second criteria may comprise overhead criteria (e.g., thresholds), such as a threshold ratio or a threshold number of wireless devices (e.g., that receive a beam formed transmission over the carrier). For example, a calculated overhead may meet an overhead criteria when the calculated overhead is below a threshold for the overhead criteria. In an embodiment, a threshold for the first criteria may be greater than a threshold for the second criteria (e.g., the first criteria may be less stringent than the second criteria).

In an embodiment, the determined adjustment may be based on a comparison of the calculated overhead for a potential primary carrier and the calculated overhead for the current primary carrier. For example, where the current primary carrier for the carrier aggregation comprises a calculated overhead that is less than the calculated overhead for other carriers (e.g., other carriers available for communication at access node 510), it may be determined that an adjustment to the primary carrier of the carrier aggregation is not available. Where the current primary carrier for the carrier aggregation comprises a calculated overhead that is greater than the calculated overhead for one or more carriers (e.g., other carriers available for communication at access node 510), it may be determined that an adjustment to the primary carrier is available for the one or more carriers that comprise a calculated overhead that is less than the calculated overhead for the current primary carrier.

In an embodiment, an adjustment may be determined to be available when the adjustment would increase the data rate (or throughput) for wireless device 502. For example, the addition of a secondary component carrier may increase the data rate experienced by wireless device 502 when communicating with access node 510. Accordingly, when an additional secondary component carrier is determined to be available, it may be determined that an adjustment to the carrier aggregation is available. In another example, if an adjustment to the primary component carrier is available (e.g., based on a comparison of calculated overheads for the carriers), it may be determined that an adjustment to the carrier aggregation is available.

At step 610, a secondary carrier for the communication between the wireless device and the access node may be adjusted. For example, a configuration for the carrier aggregation used for communication between access node 510 and wireless device 502 may be adjusted when an adjustment is determined to be available. In an embodiment, the adjustment may comprise an adjustment to one or more of the secondary carriers. The adjustment may comprise a change in the number of secondary component carriers and/or a change in the carriers used as secondary component carriers.

In an embodiment, the adjustment may be based on the calculated overhead for the one or more carriers. For example, one or more carriers may comprise a calculated overhead that meets the first criteria, and these carriers may be available as secondary component carriers. One or more of the available carriers may be added as additional secondary component carriers.

In an embodiment, one or more current secondary component carriers may be switched to one or more carriers determined to be available as secondary component carriers. For example, the calculated overhead for one or more current secondary component carriers may be compared to the calculated overhead for one or more carriers determined to be available as secondary component carriers. When the calculated overhead for a current secondary component carriers is greater than a calculated overhead for a potential secondary component carrier, the carriers may be switched such that the potential secondary component carriers becomes an actual secondary component carrier for the carrier aggregation.

At step 612, a primary carrier for the communication between the wireless device and the access node may be adjusted. For example, a configuration for the carrier aggregation used for communication between access node 510 and wireless device 502 may be adjusted when an adjustment is determined to be available. In an embodiment, the adjustment may comprise an adjustment to the primary carrier.

In an embodiment, the adjustment may be based on the calculated overhead for the one or more carriers. For example, one or more carriers may comprise a calculated overhead that meets the second criteria, and these carriers may be available as a primary component carrier. In this example, the current primary component carrier may be switched to a new primary component carrier. For example, the calculated overhead for the primary component carrier may be compared to the calculated overhead for one or more carriers determined to be available as a primary component carrier. When the calculated overhead for the current primary component carrier is greater than a calculated overhead for a potential primary component carrier, the carriers may be switched such that the potential primary component carrier becomes and actual primary component carrier for the carrier aggregation. In an embodiment, the potential primary component carrier that comprises the smallest calculated overhead from among the potential primary component carriers may serve as the new primary component carrier for the carrier aggregation.

In an embodiment, the calculated overhead for a carrier may comprise a number of wireless devices that receive a beam formed signal over the carrier, and a primary component carrier for the carrier aggregation may be adjusted based on this calculated number for each available carrier. For example, the number of wireless devices that receive a beam formed signal over the primary component carrier may be compared to the number of wireless devices that receive a beam formed signal over one or more other carriers determined to be available as a primary component carrier. When the number of wireless devices that receive a beam formed signal over the current primary component carrier is greater than a number of wireless devices that receive a beam formed signal over a potential primary component carrier, the carriers may be switched such that the potential primary component carrier becomes and actual primary component carrier for the carrier aggregation. In an embodiment, the potential primary component carrier that comprises the smallest number of wireless devices that receive a beam formed signal over that carrier from among the set of potential primary component carriers may serve as the new primary component carrier for the carrier aggregation.

In an embodiment, an adjustment to the primary component carrier may be performed after or before an adjustment to one or more of the secondary component carriers is performed. For example, at step 610, one or more secondary component carriers may be adjusted for the carrier aggregation. It may then be determined if the conditions for access node 510 and/or wireless device 502 still meet the beamforming criteria. For example, a determination similar to that described herein at step 604 may be performed after an adjustment to the one or more secondary component carriers. If the conditions still meet the beamforming criteria, an adjustment to the primary carrier may be performed if available. If the conditions no longer meet the beamforming criteria, the carrier aggregation may be protected and access node 510 may continue to communicate with wireless device 502 without a beam formed signal (e.g., prior to an adjustment to the primary component carrier).

In another example, an adjustment may be performed to the primary component carrier prior to an adjustment to a secondary component carrier. It may then be determined if the conditions for access node 510 and/or wireless device 502 still meet the beamforming criteria. For example, a determination similar to that described herein at step 604 may be performed after an adjustment to the primary component carrier. If the conditions still meet the beamforming criteria, an adjustment to one or more secondary component carriers may be performed if available. If the conditions no longer meet the beamforming criteria, the carrier aggregation may be protected and access node 510 may continue to communicate with wireless device 502 without a beam formed signal (e.g., prior to an adjustment to the primary component carrier).

At step 614, a beam formed signal may be transmitted from the access node to the wireless device when an adjustment to the carrier aggregation is not determined to be available. For example, if an adjustment to the carrier aggregation is determined not to be available, access node 510 may transmit a beam formed signal to wireless device 502 based on the conditions for access node 510 and/or wireless device 502 meeting the beamforming criteria. The beam formed signal may be similar to beam formed signal 206B of FIG. 2B.

In an embodiment, access node 510 may transmit a beam formed signal to wireless device 502 if, after one or more adjustments to the carrier aggregation, the conditions still meet the beamforming criteria. For example, after one or more adjustment to the primary component carrier and/or one or more secondary component carriers for the carrier aggregation, the conditions for access node 510 and/or wireless device 502 may be compared to a beamforming criteria, as described herein. If the conditions after adjustment still meet the beamforming criteria, a beam formed signal may be transmitted from access node 510 to wireless device 502.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
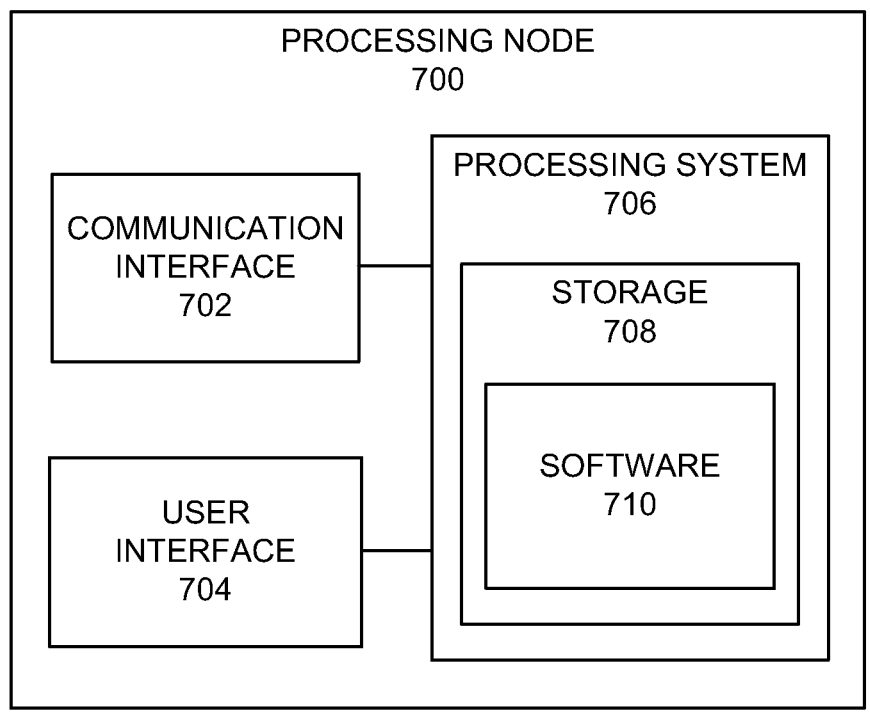
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 406 and gateway node 408. Processing node 700 can also be an adjunct or component of a network element, such as an element of access nodes 104 or 404 and the like. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for protecting carrier aggregation, the method comprising:
   communicating data between an access node and a wireless device using carrier aggregation wherein communication is performed over a primary carrier and a secondary carrier;
   determining that conditions for the access node and the wireless device meet a beamforming criteria;
   determining whether an adjustment to a configuration for the carrier aggregation is available for the wireless device by calculating an overhead associated with a plurality of carriers available to be used for wireless communications at the wireless device; and
   adjusting the configuration for the carrier aggregation wherein the primary carrier used for communication between the access node and the wireless device is changed to a carrier selected from the plurality of carriers based on the calculated overhead when the adjustment is determined to be available.

2. The method of claim 1, further comprising:
   transmitting a beam formed signal to the wireless device when the adjustment is determined to be unavailable.

3. The method of claim 1, wherein determining that an adjustment to the configuration for the carrier aggregation is available comprises determining that an adjustment to the configuration for the carrier aggregation that increases a data rate for communication between the access node and the wireless device is available.

4. The method of claim 3, wherein adjusting the configuration for the carrier aggregation comprises adjusting secondary carriers used for communication between the wireless device and the access node.

5. The method of claim 4, wherein adjusting the configuration for the carrier aggregation comprises adjusting a number of secondary carriers used for communication between the wireless device and the access node.

6. The method of claim 4, further comprising:
calculating an overhead associated with a plurality of carriers available to be used for wireless communications at the wireless device; and
adjusting the configuration for the carrier aggregation wherein a secondary carrier used for communication between the access node and the wireless device is changed to one of the plurality of carriers that comprises a calculated overhead that meets an overhead criteria when the adjustment is determined to be available.

7. The method of claim 6, wherein
calculating an overhead associated with the plurality of carriers comprises calculating a number of beam formed transmissions from the access node over each carrier, and
adjusting the configuration for the carrier aggregation wherein the secondary carrier used for communication between the access node and the wireless device is changed to one of the plurality of carriers with a calculated overhead that meets an overhead criteria comprises adjusting the configuration wherein the secondary carrier is changed to a carrier with a number of beam formed transmissions that meets the overhead criteria.

8. The method of claim 1, wherein adjusting the configuration for the carrier aggregation comprises changing the primary carrier to a carrier selected from the plurality of carriers having a lowest calculated overhead.

9. The method of claim 8, wherein
calculating an overhead associated with the plurality of at carriers comprises calculating a number of beam formed transmissions from the access node over each carrier, and
adjusting the configuration for the carrier aggregation wherein the primary carrier is changed to the carrier with the lowest calculated overhead comprises adjusting the configuration wherein the primary carrier is changed to the carrier that comprises the least number of beam formed transmissions.

10. A system for protecting carrier aggregation, the system comprising:
an access node with a processor configured to:
communicate data between the access node and a wireless device using carrier aggregation wherein communication is performed over a primary carrier and a secondary carrier;
determine that conditions for the access node and the wireless device meet a beamforming criteria;
determine whether an adjustment to a configuration for the carrier aggregation is available for the wireless device by calculating an overhead associated with a plurality of carriers available to be used for wireless communications at the wireless device; and
adjust the configuration for the carrier aggregation wherein a primary carrier used for communication between the access node and the wireless device is changed to a carrier selected from the plurality of carriers based on the calculated overhead when the adjustment is determined to be available.

11. The system of claim 10, wherein the access node is further configured to:
transmit a beam formed signal to the wireless device when the adjustment is determined to be unavailable.

12. The system of claim 10, wherein determining that an adjustment to the configuration for the carrier aggregation is available comprises determining that an adjustment to the configuration for the carrier aggregation that increases a data rate for communication between the access node and the wireless device is available.

13. The system of claim 12, wherein adjusting the configuration for the carrier aggregation comprises adjusting secondary carriers used for communication between the wireless device and the access node.

14. The system of claim 13, wherein adjusting the configuration for the carrier aggregation comprises adjusting a number of secondary carriers used for communication between the wireless device and the access node.

15. The system of claim 13, wherein the access node is further configured to:
adjust the configuration for the carrier aggregation such that wherein a secondary carrier used for communication between the access node and the wireless device is changed to one of the plurality of carriers that comprises a calculated overhead that meets an overhead criteria when the adjustment is determined to be available.

16. The system of claim 15, wherein
calculating an overhead associated with the plurality of at carriers comprises calculating a number of beam formed transmissions from the access node over each carrier, and
adjusting the configuration for the carrier aggregation wherein the secondary carrier used for communication between the access node and the wireless device is changed to one of the plurality of carriers with a calculated overhead that meets an overhead criteria comprises adjusting the configuration wherein the secondary carrier is changed to a carrier with a number of beam formed transmissions that meets the overhead criteria.

17. The system of claim 10, wherein adjusting the configuration for the carrier aggregation comprises changing the primary carrier to a carrier selected from the plurality of carriers having a lowest calculated overhead.

18. The system of claim 17, wherein
calculating an overhead associated with the plurality of at carriers comprises calculating a number of beam formed transmissions from the access node over each carrier, and
adjusting the configuration for the carrier aggregation wherein the primary carrier is changed to the carrier with the lowest calculated overhead comprises adjusting the configuration wherein the primary carrier is changed to the carrier that comprises the least number of beam formed transmissions.

* * * * *